(12) United States Patent
Klingbeil et al.

(10) Patent No.: US 11,719,152 B2
(45) Date of Patent: Aug. 8, 2023

(54) MULTIVARIABLE DYNAMIC CONTROL SYSTEM OF A MULTI-FUEL ENGINE

(71) Applicant: Transportation IP Holdings, LLC, Norwalk, CT (US)

(72) Inventors: Adam Edgar Klingbeil, Ballston Lake, NY (US); James Robert Mischler, Erie, PA (US); Daniel George Norton, Niskayuna, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 120 days.

(21) Appl. No.: 17/345,679

(22) Filed: Jun. 11, 2021

(65) Prior Publication Data

US 2021/0301714 A1 Sep. 30, 2021

Related U.S. Application Data

(60) Continuation-in-part of application No. 15/899,068, filed on Feb. 19, 2018, now abandoned, and a
(Continued)

(51) Int. Cl.
*F02D 41/00* (2006.01)
*F02B 3/08* (2006.01)
(Continued)

(52) U.S. Cl.
CPC ............. *F02B 3/08* (2013.01); *F02D 19/061* (2013.01); *F02D 19/0692* (2013.01);
(Continued)

(58) Field of Classification Search
CPC .... F02B 3/08; F02B 43/10; F02B 7/06; F02D 19/061; F02D 19/105; F02D 29/02;
(Continued)

(56) References Cited

U.S. PATENT DOCUMENTS 2,767,691 A * 10/1956 Mengelkamp ........ F02D 19/061
  123/1 R
2006/0169243 A1 * 8/2006 Neunteufl .................. F02B 1/12
  123/568.21
(Continued)

FOREIGN PATENT DOCUMENTS

GB 2479567 A * 10/2011 ......... F02D 19/0647
JP 10252529 A * 9/1998
(Continued)

*Primary Examiner* — Hung Q Nguyen
(74) *Attorney, Agent, or Firm* — McCoy Russell LLP

(57) ABSTRACT

An engine control unit of a multi-fuel is provided. The engine consumes a mixture of a first combustion fuel and a second combustion fuel. The engine control unit includes hardware circuitry that includes one or more processors configured to calculate an autoignition delay of the mixture of the air and the second combustion fuel based on current operating conditions of the multi-fuel engine. The one or more processors also are configured to calculate an upper limit on an amount of the second combustion fuel that is supplied to the multi-fuel engine based on the autoignition delay that is calculated.

20 Claims, 2 Drawing Sheets

Related U.S. Application Data continuation-in-part of application No. 15/889,662, filed on Feb. 6, 2018, now Pat. No. 11,143,090, which is a division of application No. 14/190,482, filed on Feb. 26, 2014, now Pat. No. 9,920,683, said application No. 17/345,679 is a division of application No. 16/942,516, filed on Jul. 29, 2020, now Pat. No. 11,473,515, which is a division of application No. 15/095,388, filed on Apr. 11, 2016, now abandoned, which is a continuation-in-part of application No. 14/251,726, filed on Apr. 14, 2014, now Pat. No. 9,309,819, which is a continuation-in-part of application No. PCT/US2012/064929, filed on Nov. 14, 2012, which is a continuation of application No. 13/328,438, filed on Dec. 16, 2011, now Pat. No. 8,682,512, said application No. 15/095,388 is a continuation-in-part of application No. 15/013,432, filed on Feb. 2, 2016, now abandoned, which is a continuation-in-part of application No. 13/484,621, filed on May 31, 2012, now Pat. No. 9,249,744, said application No. 16/942,516 is a continuation-in-part of application No. 15/013,432, filed on Feb. 2, 2016, now abandoned, which is a continuation-in-part of application No. 13/484,621, filed on May 31, 2012, now Pat. No. 9,249,744.

(51) Int. Cl.

| | | |
|---|---|---|
| *F02D 41/40* | (2006.01) | |
| *F02D 35/02* | (2006.01) | |
| *F02D 19/06* | (2006.01) | |
| *F02D 19/10* | (2006.01) | |
| *F02D 29/02* | (2006.01) | |
| *F02D 41/30* | (2006.01) | |
| *F02M 26/43* | (2016.01) | |
| *F02M 26/05* | (2016.01) | |
| *F02M 26/23* | (2016.01) | |

(52) U.S. Cl.
CPC .......... *F02D 19/105* (2013.01); *F02D 29/02* (2013.01); *F02D 35/027* (2013.01); *F02D 41/0025* (2013.01); *F02D 41/401* (2013.01); *F02D 41/008* (2013.01); *F02D 41/3047* (2013.01); *F02M 26/05* (2016.02); *F02M 26/23* (2016.02); *F02M 26/43* (2016.02); *Y02T 10/30* (2013.01); *Y02T 10/40* (2013.01)

(58) Field of Classification Search
CPC .. F02D 35/027; F02D 41/0025; F02D 41/401; F02D 41/008; F02D 41/3047; F02D 2200/0406; F02D 19/0642; F02D 19/081; F02D 35/028; F02D 41/0027; F02D 2200/0414; F02M 26/05; F02M 26/23; F02M 26/43; F02M 35/1038; F02M 21/0206; F02M 37/0064; F02M 25/03; Y02T 10/30; Y02T 10/40
See application file for complete search history.

(56) References Cited

U.S. PATENT DOCUMENTS

| | | | | |
|---|---|---|---|---|
| 2008/0230041 | A1* | 9/2008 | Brusslar | F02D 19/084 |
| | | | | 60/299 |
| 2015/0322896 | A1* | 11/2015 | Arnold | F02D 41/1439 |
| | | | | 123/445 |
| 2016/0069291 | A1* | 3/2016 | Ge | B60W 20/15 |
| | | | | 701/103 |
| 2018/0320627 | A1* | 11/2018 | Hoshi | F02D 19/00 |

FOREIGN PATENT DOCUMENTS

| | | | | | |
|---|---|---|---|---|---|
| JP | 2005273513 | A | * | 10/2005 | ............ F02D 35/02 |
| JP | 2011202630 | A | * | 10/2011 | |
| JP | 2016044623 | A | * | 4/2016 | |
| WO | WO-2009130777 | A1 | * | 10/2009 | ........... F02D 19/061 |

\* cited by examiner

MULTIVARIABLE DYNAMIC CONTROL SYSTEM OF A MULTI-FUEL ENGINE

CROSS-REFERENCE TO RELATED APPLICATIONS

The present application is a continuation-in-part of U.S. Non-Provisional patent application Ser. No. 15/899,068, entitled "MULTIVARIABLE DYNAMIC CONTROL SYSTEM OF A MULTI-FUEL ENGINE," and filed on Feb. 19, 2018. The present application is also a continuation-in-part of U.S. Non-Provisional patent application Ser. No. 15/889,662, entitled "SYSTEMS AND METHOD FOR CONTROLLING AUTO-IGNITION," and filed on Feb. 6, 2018. U.S. Non-Provisional patent application Ser. No. 15/889,662 is a divisional of U.S. Non-Provisional patent application Ser. No. 14/190,482, entitled "SYSTEMS AND METHOD FOR CONTROLLING AUTO-IGNITION," and filed on Feb. 26, 2014, which issued as U.S. Pat. No. 9,920,683 on Mar. 20, 2018. The present application is also a continuation-in-part of U.S. Non-Provisional patent application Ser. No. 16/942,516, entitled "MULTI-FUEL SYSTEM AND METHOD," and filed on Jul. 29, 2020. U.S. Non-Provisional Patent application Ser. No. 16/942,516 is a divisional of U.S. Non-Provisional patent application Ser. No. 15/095,388, entitled "MULTI-FUEL SYSTEM AND METHOD," and filed on Apr. 11, 2016. U.S. Non-Provisional patent application Ser. No. 15/095,388 is a continuation-in-part of U.S. Non-Provisional patent application Ser. No. 14/251,726, entitled "MULTI-FUEL SYSTEM AND METHOD," and filed on Apr. 14, 2014, which issued as U.S. Pat. No. 9,309,819 on Apr. 12, 2016. U.S. Non-Provisional patent application Ser. No. 14/251,726 is a continuation-in-part of International Application No. PCT/US2012/064929, entitled "FUEL OPTIMIZING SYSTEMS FOR A MOBILE ASSET, AND A RELATED METHOD THEREOF," and filed on Nov. 14, 2012. International Application No. PCT/US2012/064929 is a continuation of U.S. Non-Provisional patent application Ser. No. 13/328,438, entitled "FUEL OPTIMIZING SYSTEMS FOR A MOBILE ASSET, AND A RELATED METHOD THEREOF," and filed on Dec. 16, 2011, which issued as U.S. Pat. No. 8,682,512 on Mar. 3, 2014. U.S. Non-Provisional patent application Ser. No. 15/095,388 is also a continuation-in-part of U.S. Non-Provisional patent application Ser. No. 15/013,432, entitled "METHOD FOR OPERATING AN ENGINE," and filed on Feb. 2, 2016. U.S. Non-Provisional patent application Ser. No. 15/013,432 is a continuation-in-part of U.S. Non-Provisional patent application Ser. No. 13/484,621, entitled "METHOD FOR OPERATING AN ENGINE," and filed on May 31, 2012, which issued as U.S. Pat. No. 9,249,744 on Feb. 16, 2016. U.S. Non-Provisional patent application Ser. No. 16/942,516 is also a continuation-in-part of U.S. Non-Provisional patent application Ser. No. 15/013,432, entitled "METHOD FOR OPERATING AN ENGINE," and filed on Feb. 2, 2016. U.S. Non-Provisional Patent application Ser. No. 15/013,432 is a continuation-in-part of U.S. Non-Provisional patent application Ser. No. 13/484,621, entitled "METHOD FOR OPERATING AN ENGINE," and filed on May 31, 2012, which issued as U.S. Pat. No. 9,249,744 on Feb. 16, 2016. The entire contents of the above-referenced applications are hereby incorporated by reference for all purposes.

BACKGROUND

Technical Field

The subject matter described herein relates to control systems for multi-fuel vehicles.

Discussion Of Art

Vehicles can be powered by a variety of different fuels. Some vehicles can operate by consuming two different fuels at the same time. A multi-fuel vehicle can simultaneously consume fuels of different phases. Consuming different types of fuels at the same time can introduce an increased risk of engine knock in certain operating conditions (relative to consuming only a single type of fuel).

Engine knock may occur in a multi-fuel vehicle when an unburned air and premixed fuel mixture autoignites. Because the multi-fuel engine of the vehicle has a large amount of potential operating conditions it can be difficult and expensive to previously test for and identify every condition that is likely to result in engine knock, particularly when transient conditions are considered. It may be desirable to have a control system or method of operation that differs from those that are currently available.

BRIEF DESCRIPTION

In one embodiment, an engine control unit of a multi-fuel engine is provided. The engine consumes a mixture of a first fuel and a second fuel. The engine control unit includes hardware circuitry that includes one or more processors configured or programmed to calculate an autoignition delay of the mixture of the air and the second fuel based on current operating conditions of the multi-fuel engine. The one or more processors also are configured or programmed to calculate an upper limit on an amount of the second fuel that is supplied to the multi-fuel engine based on the autoignition delay that is calculated.

In one embodiment, a method includes calculating an autoignition delay of a mixture of a first fuel and a second fuel that are supplied to a multi-fuel engine. The autoignition delay is calculated based on current operating conditions of the multi-fuel engine. The method also includes calculating an upper limit on an amount of the second fuel that is supplied to the multi-fuel engine based on the autoignition delay that is calculated.

In one embodiment, a method includes monitoring one or more operating conditions of a multi-fuel engine that consumes a mixture of air, a non-premixed fuel, and a premixed fuel, measuring an amount of the premixed fuel that is supplied to the multi-fuel engine, and calculating an autoignition delay of the mixture of the air, the non-premixed fuel, and the premixed fuel. The autoignition delay represents a period of time following introduction of the premixed fuel into a cylinder of the multi-fuel engine before the premixed fuel ignites during knocking of the engine. The method also includes modifying operation of the engine based on the autoignition delay that is calculated.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
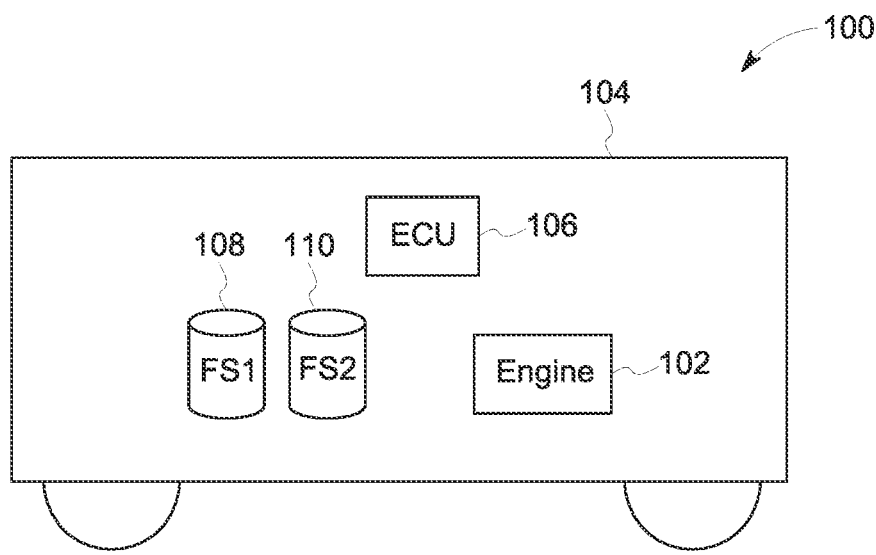
FIG. 1 illustrates one embodiment of a multivariable dynamic control system of a multi-fuel engine.

One or more embodiments of the inventive subject matter described herein provide systems and methods that predict susceptibility of a multi-fuel engine to knock, and/or to implement one or more responsive actions that change operation of the engine to prevent knock or to reduce the likelihood of knock. The multi-fuel engine concurrently or simultaneously consumes two or more combustion fuels to convert energy stored in the fuels to another form of energy, such as rotation of a shaft. In one embodiment, the engine operates to propel a vehicle, but optionally can operate to perform other work, such as to generate electric current for powering a stationary load. The multi-fuel engine may differ from a strictly bi-fuel engine in that a bi-fuel engine can consume different fuels at different times (e.g., by switching between which fuel is consumed at different times), whereas the multi-fuel engine consumes two or more different combustion fuels at the same time. Alternatively, the engine may be a bi-fuel engine in another embodiment.

The multi-fuel engine may consume combustion fuels to convert the energy stored in those fuels to another form of energy. While one or more stabilizing fuels may or may not be provided to the engine (in addition to combustion fuels), the term "combustion fuel" as used herein excludes and does not include a stabilizing fuel in one embodiment. A stabilizing fuel (also referred to as a fuel stabilizer) can be added to a combustion fuel or mixture of combustion fuels to change the flame speed (or rate of expansion of a flame front in a combustion reaction) of combustion fuel(s). A stabilizing fuel also can be added to combustion fuel(s) to provide a protective layer for the combustion fuel(s) in a tank or other container. Stabilizing fuels can be pure hydrogen, pure methane, or a combination thereof, or can be a combination of antioxidants and lubricants. While the combustion fuel or fuels are converted into another form of energy by the engine, a stabilizing fuel may not be converted into another form of energy. For example, the engine may not consume the stabilizing fuel to rotate a shaft, propel a vehicle, or perform other work, such as to generate electric current.

The inventive subject matter described herein can prevent (or reduce the chance of) engine knock by controlling the substitution ratio. The substitution ratio is the amount of premixed combustion fuel relative to total combustion fuel supplied to the cylinders of the engine. The systems and methods described herein may, for example, increase or maximize the substitution rate while controlling the system to maintain knock-free operation, while also ensuring that the non-premixed combustion fuel is not completely eliminated. The systems and methods can calculate and/or estimate an autoignition delay based at least in part on one or more measured operating parameters of the engine (including the fuel rates). The amount of delay may correlate to a likelihood of engine knock. Optionally, the calculated delay can be compared with a measured knock index value to determine the likelihood of engine knock (with delays that are longer correlating to a smaller index value and being less likely to result in engine knock than delays that are shorter with a high index value). The measured knock index value can be determined from a variety of sensors including vibration sensors, knock sensors, pressure sensors, or the like. This information can then be used to guide adjustments to a powered system that includes the engine. For example, during transient events of the powered system, smaller step modifications to the substitution rate may be made (relative to times outside of the transient events) if the autoignition delay is relatively short (e.g., when the system is approaching a knocking condition).

In one embodiment, the systems and methods can calculate a maximum or other upper limit on the substitution rate based on the operating parameters of the engine and a desired minimum (or other limit) autoignition delay. This may be used to increase or maximize the substitution rate because the calculated maximum or upper limit represents the upper level that the powered system can maintain to ensure that the substitution rate is maximized or increased while avoiding a knocking condition that can be detrimental to the mechanical health of the engine. The upper limit or maximum can be the largest or greatest value that the substitution rate can be or have. While the substitution rate can change over time or be different at different times, the substitution rate does not exceed the upper limit. The substitution rate may, at times, be less than the upper limit or maximum and, at other times, be equal to the upper limit or maximum, but is never greater than the upper limit or maximum in one embodiment.

The autoignition delays described herein can be experimentally measured and/or modeled based on thermodynamics of the engine and chemistry of the combustion fuel(s). For example, the systems and methods described herein examine several variables that can be modeled, measured or estimated within an engine control unit to calculate whether a condition in which the multi-fuel engine is operating is likely to result in engine knock. These calculations are based on the physics of thermodynamics and combustion in the multi-fuel engine, and therefore can be tuned using a relatively small number of experiments and then be extrapolated to conditions that are not or cannot be easily tested with an engine, and may only be seen in transient operation of the engine. The probability of knock that is acceptable can be static and pre-set, or optionally can be dynamic based on, for example, determined operating parameter settings or manual input from an operator. In one embodiment, the system may switch between two or more operating modes where the operation of the engine is switched to and from a lower probability of knock and a higher probability of knock to affect the output of the engine's power, performance, emissions level and the like.

At least one technical effect of an embodiment of the inventive subject matter described herein is to reduce how often knock occurs in a multi-fuel engine and/or to eliminate knock in the multi-fuel engine based on measured operating conditions of the engine. The systems and methods can calculate knocking conditions based on a number of operating conditions (also referred to herein as engine parameters). From these inputs, an ignition or autoignition delay is calculated for a premixed combustion fuel-air mixture, which can then be used to infer whether the mixture is likely to auto-ignite (e.g., knock). This delay represents a time delay between introducing the premixed combustion fuel into a cylinder and the time at which the mixture will autoignite in the cylinder. The premixed combustion fuel substitution rate can be adjusted based at least in part on this calculated ignition delay or a "likelihood parameter." The premixed combustion fuel substitution rate is the amount or rate at which premixed combustion fuel is supplied to the multi-fuel engine in place of non-premixed combustion fuel. For example, the multi-fuel engine (or one or more, or all, cylinders of the engine) may receive a total amount or rate of combustion fuels T that can be expressed as:

$$T=G+L$$

where G represents the amount or rate at which premixed combustion fuel is supplied to one or more (or all) cylinders of the multi-fuel engine and L represents the amount or rate at which non-premixed combustion fuel is supplied to one or more (or all) cylinders of the engine. The total amount or rate of combustion fuels T supplied to the engine and/or cylinder(s) may not change. Therefore, if the premixed combustion fuel substitution rate is adjusted to decrease the amount or rate of premixed combustion fuel supplied to the engine and/or cylinder(s) by an amount $\Delta G$, then the amount or rate of non-premixed combustion fuel supplied to the engine and/or cylinder(s) can increase by an amount $\Delta L$:

$$T=G+L=(G-\Delta G)+(L+\Delta L)$$

Conversely, if the premixed combustion fuel substitution rate dictates increasing the amount or rate of premixed combustion fuel into the engine and/or cylinder(s) by an amount $\Delta G$, then the amount or rate of non-premixed combustion fuel supplied to the engine and/or cylinder(s) can decrease by an amount $\Delta L$:

$$T=G+L=(G+\Delta G)+(L-\Delta L)$$

The systems and methods can, in one embodiment, model the thermochemistry of the multi-fuel engine to predict the conditions inside one or more (or all) cylinders of the engine during operation of the engine over a wide range of possible operating conditions. In one embodiment, an engine may have donor and non-donor cylinders for an exhaust gas recirculation (EGR) system, and as such the controller may treat the various sub-groups of cylinders differently from each other. The systems and methods can predict autoignition behavior of the engine for peak cylinder pressure conditions where unburned premixed combustion fuel and air mixtures are most likely to (or have a determined level of probability to) autoignite or detonate instead of burning or being combusted. Autoignition is ignition of the premixed combustion fuel and air mixture without an external source of ignition, such as a spark from a spark plug or flame propagation within the premixed fuel-air mixture. Burning or combustion of a combustion fuel (gas and/or liquid) and air mixture is an exothermic redox chemical reaction between the combustion fuel (gas and/or liquid) and an oxidant (air) brought about by the external source of ignition.

A transfer function can be used by the systems and methods to map the premixed combustion fuel substitution rate for the supply of combustion fuels to the engine as a function of the operating conditions and/or autoignition delay. These operating conditions can include manifold airflow temperature of the engine, manifold airflow pressure of the engine, air flow (rate and/or amount) into or out of the engine, the rate at which non-premixed combustion fuel is supplied to the engine or one or more cylinders of the engine, the speed at which the engine is operating, the timing of combustion fuel injection into the cylinder(s) of the engine, the autoignition delay minimum allowable threshold, a ratio of air-to-fuel (AFR) injected into one or more cylinders of the engine (e.g., the ratio of air to the premixed combustion fuel and/or the non-premixed combustion fuel), the temperature of the exhaust out of the engine or out of one or more cylinders of the engine, a speed at which a turbocharger coupled with the engine operates, a ratio of oxygen to fuel (OFR) in the cylinder(s) of the engine (e.g., a ratio of the amount of oxygen to the amount of premixed combustion fuel and/or non-premixed combustion fuel), a combustion fuel substitution ratio (e.g., a ratio indicative of how much non-premixed combustion fuel to the engine has been replaced by supply of the premixed combustion fuel to the engine), and/or a cylinder pressure (e.g., the largest or peak pressure inside one or more of the cylinders of the engine during a combustion cycle).

The transfer function can be used by the systems and methods to calculate an upper limit on the quantity of premixed combustion fuel that can be injected into the cylinders of the engine for a given operating condition (or combination of conditions) and autoignition delay (e.g., a designated likelihood of engine knock). In one example, the premixed combustion fuel substitution rate (e.g., the ratio of premixed combustion fuel to total combustion fuel supplied to the engine or engine cylinder) decreases for hotter manifold airflow temperatures, greater manifold airflow pressures, decreased air flows into or out of the engine, increases in the rate at which non-premixed combustion fuel is supplied to the engine or one or more cylinders of the engine, slower engine speeds, earlier combustion fuel injection timings, shorter autoignition delays, smaller air-to-fuel ratios, hotter exhaust temperatures, faster turbocharger speeds, smaller oxygen-to-fuel ratios, and/or greater cylinder pressures. For example, less premixed combustion fuel and more non-premixed combustion fuel may be supplied to the engine and/or cylinder(s) for hotter manifold airflow temperatures, greater manifold airflow pressures, decreased air flows into or out of the engine, increases in the rate at which non-premixed combustion fuel is supplied to the engine or one or more cylinders of the engine, slower engine speeds, earlier combustion fuel injection timings, shorter autoignition delays, smaller air-to-fuel ratios, hotter exhaust temperatures, faster turbocharger speeds, smaller oxygen-to-fuel ratios, and/or greater cylinder pressures.

Conversely, more premixed combustion fuel and less non-premixed combustion fuel may be supplied to the engine and/or cylinder(s) for cooler manifold airflow temperatures, reduced manifold airflow pressures, increased air flows into or out of the engine, decreases in the rate at which non-premixed combustion fuel is supplied to the engine or one or more cylinders of the engine, faster engine speeds, later fuel injection timings, longer autoignition delays, greater air-to-fuel ratios, cooler exhaust temperatures, slower turbocharger speeds, greater oxygen-to-fuel ratios, and/or smaller cylinder pressures. In one embodiment, the systems and methods can reduce, but not eliminate the supply of non-premixed combustion fuel to the engine and/or cylinders. That is, regardless of the increase in the premixed combustion fuel substitution rate (e.g., regardless of how much the amount or rate of premixed combustion fuel supply is increased), there is always at least some non-premixed fuel injected into the engine and/or cylinder(s).

In one embodiment, the systems and methods can calculate the ignition delay as a function of operating condition (or combination of operating conditions) and premixed combustion fuel being supplied to the engine and/or cylinder(s). This can be calculated as a real-time estimate of knock likelihood, even during transient events (e.g., increasing power from low to high while operating in a multi-fuel mode of the engine). This knock likelihood estimate can be presented to an operator of the vehicle and/or to an engine control unit of the vehicle, so that the operator can manually implement and/or the engine control unit can automatically implement one or more responsive actions. The responsive action(s) can include changes in control of the vehicle that reduce the likelihood of knock, such as derating the engine of the vehicle, adjusting the timing of the fuel injection or combustion event, reducing the substitution rate, reducing a throttle setting, turning the engine off, increasing a rate of circulation of an engine coolant, injecting a coolant (e.g., water) into the cylinder(s) of the engine, changing a flow rate of coolant through an EGR cooler, changing an operation of one or more turbochargers, and the like.

FIG. 1 illustrates one embodiment of a multivariable dynamic control system 100 of a multi-fuel engine 102. The engine is shown as being disposed in a mobile powered system such as a vehicle 104, but optionally may be an engine disposed in another type of powered system, such as a power-generating system (e.g., a power plant). The vehicle can represent an automobile, a truck, a rail vehicle (e.g., locomotive), marine vessel, off-highway vehicle (e.g., a mining vehicle or other vehicle that is not legally permitted or that is not designed for operating on public roadways), or the like. The system includes an engine control unit 106 that controls operation of the engine. The engine control unit represents hardware circuitry that includes and/or is connected with one or more processors (e.g., one or more microprocessors, field programmable gate arrays, and/or integrated circuits) that examine the inputs described herein to determine engine operating conditions or parameters indicative of increased likelihoods of engine knock and that can generate control signals to control the flow of premixed and/or non-premixed combustion fuel to the engine to reduce or eliminate the likelihood of engine knock. The engine control unit optionally is connected with one or more input devices (e.g., throttles, levers, touchscreens, etc.) to receive operator input to control operation of the engine.

The engine control unit controls the flow of premixed combustion fuel to the engine from a first combustion fuel source or container 108 ("FS1" in FIG. 1) of combustion fuel and controls the flow of non-premixed combustion fuel to the engine from a second combustion fuel source or container 110 ("FS2" in FIG. 1) of combustion fuel. The containers represent tanks (pressurized or unpressurized) or other bodies that safely hold the combustion fuels during operation of the powered system. The premixed combustion fuel can be gasoline, ethanol, methanol, syngas, natural gas, liquified petroleum gas, and/or hydrogen gas. With respect to hydrogen gas, the premixed combustion fuel may be hydrogen gas that is consumed by the engine to perform work (e.g., rotate a shaft, propel a vehicle, use to generate current, etc.). This is in contrast to stabilizing fuels formed from hydrogen that are added to stabilize combustion fuel, but that are not consumed by an engine to perform work. The non-premixed combustion fuel can be diesel fuel, kerosene, JP8 jet fuel, or the like. Alternatively, the non-premixed combustion fuel can be hydrogen. Optionally, the engine control unit can control the flow of combustion fuel from one or more additional containers and/or one or more additional types of combustion fuel (from one or more additional containers of combustion fuel) to the engine.

Figure 2:
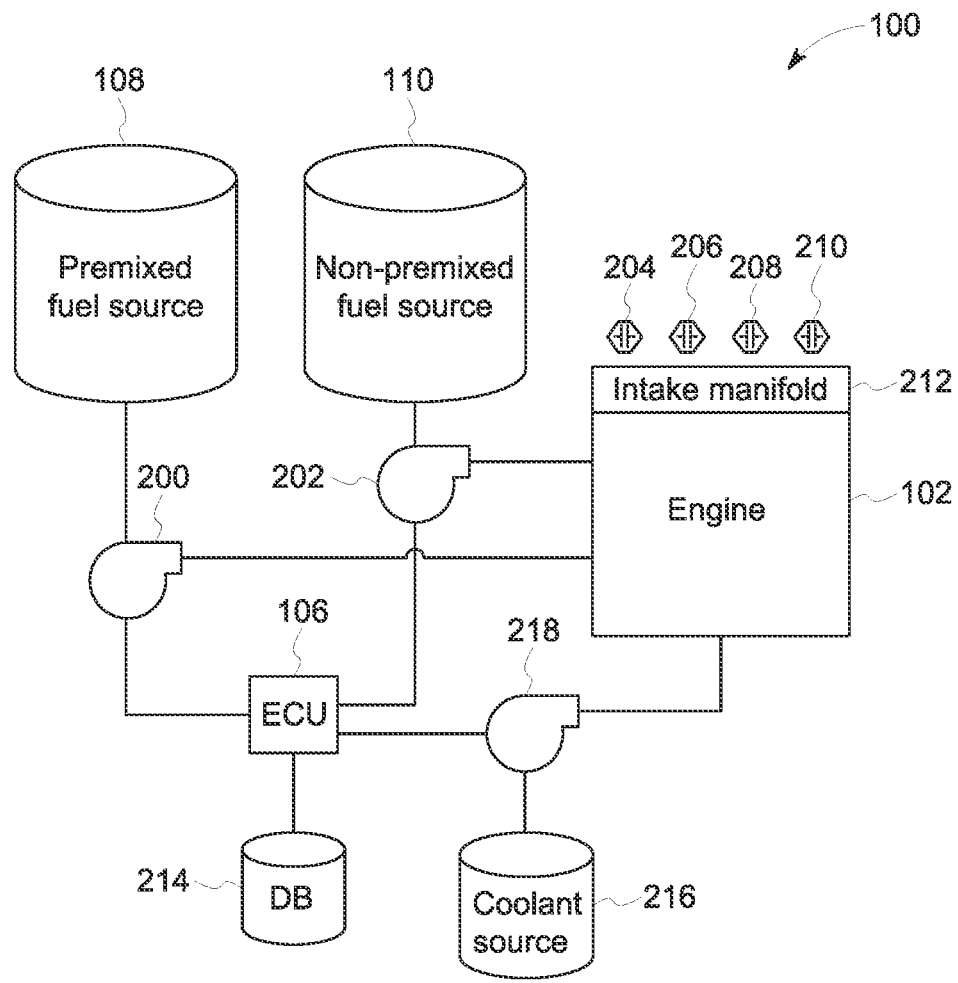
FIG. 2 illustrates additional components of the control system shown in FIG. 1.

FIG. 2 illustrates additional components of the control system shown in FIG. 1. The engine control unit can control the flow of the different types of combustion fuel from the containers ("Premixed fuel Source" and "Non-premixed Fuel Source" in FIG. 2) by generating and sending control signals to pumps 200, 202 associated with the containers. The different pumps can control the rate at which the combustion fuels in the different containers flow to cylinders of the engine via different conduits.

The engine control unit monitors one or more operating conditions of the multi-fuel engine and/or powered system 104 (shown in FIG. 1) while the engine consumes a mixture of air, the non-premixed combustion fuel, and the premixed combustion fuel. The engine control unit can monitor the operating condition(s) by examining signals output by one or more sensors 204, 206, 208, 210. Although four sensors are shown in FIG. 2, the system may include as few as a single sensor, or more than four sensors. Each sensor may measure a single operating condition of the system or engine, or may measure multiple operating conditions of the system or engine.

For example, one or more of the sensors can include a thermocouple that measures the temperature of the airflow in an intake manifold 212 of the engine. One or more of the sensors can include a pressure sensor that measures the pressure in the manifold of the engine and/or a pressure sensor that measures the pressure in one or more cylinders of the engine. Optionally, one or more of the sensors can include an airflow sensor that measures the amount or rate of air flowing in the manifold. The sensors can include a flow sensor that measures the rate at which the non-premixed combustion fuel flows from the container and/or the rate at which the premixed combustion fuel flows from the container into the cylinders of the engine. The sensors can include tachometers or other speed sensors that measure the speeds at which the engine and/or turbochargers operate. The sensors can include a thermocouple that measures the temperature of exhaust out of the engine and/or cylinders of the engine. Optionally, the exhaust temperature can be calculated from the air flow, fuel flow, and combustion timing instead of directly measuring the exhaust temperature.

These operational conditions are determined by the engine control unit based on sensed parameters represented by data or signals output by the one or more sensors. One or more alternative or additional operational conditions can be obtained by the engine control unit from a memory device 214 ("DB" in FIG. 2) of the system and/or from calculations performed by the arithmetic logic unit of one or more of the processors of the engine control unit. The memory can be a tangible and non-transitory computer readable storage medium, such as a computer hard drive, flash drive, optical disk, or the like. The operational conditions obtained from the memory and/or calculated by the engine control unit based on other sensed operational conditions can be referred to as derived operational conditions. The operational conditions can include fuel injection timing of the engine, the autoignition delay that is calculated by the engine control unit based on the operational conditions, the air-to-fuel ratio and/or oxygen-to-fuel ratio calculated by the engine control unit, the fuel substitution ratio, or the like.

Optionally, the engine control unit monitors, obtains, or otherwise determines at least one of the operating conditions using information provided by or otherwise input by an operator of the engine and/or the vehicle that includes the engine.

The engine control unit can determine a designated autoignition delay for the mixture of the air, the non-premixed combustion fuel, and the premixed combustion fuel. For example, a table, chart, or other memory structure stored in the memory and/or an internal memory of the engine control unit can associate different combinations of mixtures of air, non-premixed combustion fuel, and premixed combustion fuel with different designated autoignition delays. In one embodiment, the designated autoignition delays stored in the memory are determined from a mathematical model of the thermochemistry of the engine. This model can be determined by evaluating the time between introduction of the premixed combustion fuel into a cylinder of the engine (or another engine of the same make, model, manufacturing year, or the like) and spontaneous combustion of the mixture of air and the premixed combustion fuel under different experimentally controlled operating conditions. Alternatively, this model can be determined by evaluating the amount of time required for spontaneous combustion when the premixed combustion fuel and air are at a thermodynamic condition that is representative of the operating condition of the engine (e.g., amount of time at the temperature and pressure associated with top-dead-center (TDC) or peak cylinder pressure). The mixtures of air, non-premixed combustion fuel, and premixed combustion fuel, and the autoignition delays measured or calculated for these mixtures can be recorded, and the autoignition delays for other, different mixtures of air, non-premixed combustion fuel, and premixed combustion fuel can be extrapolated from the experimentally-determined or modeled autoignition delays. This extrapolation can be performed using a transfer function adapted to the experimental measurements of the autoignition delays.

The engine control unit, or controller, can select a designated autoignition delay that is associated with a low likelihood of autoignition of the air and premixed combustion fuel mixture. The designated autoignition delays stored in the memory and/or the engine control unit can represent different likelihoods of ignition of the premixed combustion fuel and air mixture in a cylinder (e.g., engine knock). For example, longer autoignition delays can represent smaller likelihoods of knock as the cylinder is more likely to complete a combustion cycle before the premixed combustion fuel and air mixture spontaneously ignites, while shorter autoignition delays can represent greater likelihood of knock as the cylinder is less likely to complete a combustion cycle before the premixed combustion fuel and air mixture spontaneously ignites.

The engine control unit can select the designated autoignition delay having a relatively low likelihood of autoignition. For example, the engine control unit can select a designated autoignition delay that is longer than the time from introduction of the premixed combustion fuel into a cylinder and normal combustion event (not knocking) of the premixed combustion fuel, non-premixed combustion fuel, and air mixture in the cylinder in the combustion cycle of the cylinder.

The engine control unit can calculate an upper limit on the amount of premixed combustion fuel that is supplied to the multi-fuel engine based on the operating conditions (measured and/or derived) and the designated maximum allowable autoignition delay that is selected. The engine control unit can examine the conditions in which the engine is operating and the designated autoignition delay to determine what mixture of air and premixed combustion fuel is associated with the same or similar (such as within 1%, 3%, or 5% of the same value) operating conditions. For example, the engine control unit can refer to the transfer function, list, table, or other structure in the memory that associates different operating conditions with different mixtures of air, premixed combustion fuel, and non-premixed combustion fuel and with different autoignition delays. The conditions in the memory that are the same as or similar to the operating conditions monitored by the engine control unit and that are associated with the same or similar autoignition delay can be used to find the corresponding mixture of air, premixed combustion fuel, and non-premixed combustion fuel in the memory. The amount of premixed combustion fuel in this mixture can then be identified by the engine control unit as the upper limit on premixed combustion fuel. Optionally, the engine control unit can determine the upper limit on premixed combustion fuel to be less than this amount of premixed combustion fuel. Decreasing the upper limit to below this amount of premixed combustion fuel can provide a buffer to further reduce or eliminate the likelihood of engine knock.

The amount of buffer utilized may vary depending on the ambient conditions or based on autoignition measurements. For example, the engine controller can make use of a knock sensor to detect if knock is occurring in any of the engine cylinders. If the engine controller is detecting a higher frequency of knocking cycles than expected based on the determined autoignition delay, the buffer may be increased either temporarily or permanently to reduce the frequency of knocking.

The engine control unit can restrict or change operation of the engine to ensure that no more premixed combustion fuel is supplied to the engine than this upper limit. For example, the engine control unit can change the premixed combustion fuel substitution rate at which the premixed combustion fuel is substituted for the non-premixed combustion fuel being supplied to the engine at the same time. If the engine is receiving more than this upper limit, the engine control unit can reduce the rate at which the premixed combustion fuel is supplied to the engine. The engine control unit can proceed with increasing or decreasing the rate at which the premixed combustion fuel is supplied to the engine with the non-premixed combustion fuel so long as the amount of the premixed combustion fuel does not exceed the upper limit that is determined.

The upper limit can change as operating conditions change. For example, the engine control unit can continuously determine or change the upper limit to keep the selected autoignition delay in force while the operating conditions of the engine change. This can allow for the engine control unit to modify the premixed combustion fuel substitution rate of the engine 102 in real time as the operating conditions of the engine change.

In one embodiment, the engine control unit can change the premixed combustion fuel substitution rate to reduce or eliminate the likelihood of engine knock without eliminating the flow of non-premixed combustion fuel to the engine. For example, the engine control unit can keep the upper limit at a value below 100% so that at least some non-premixed combustion fuel is always supplied to the engine (in addition to the premixed combustion fuel).

In one embodiment, the engine control unit can change the premixed combustion fuel substitution rate to maximize the substitution rate while maintaining the autoignition delay to be longer than a threshold without eliminating the flow of non-premixed combustion fuel to the engine. For example, the engine control unit can keep the lower limit at a value above zero (e.g., a non-zero value) so that at least some non-premixed combustion fuel is always supplied to the engine (in addition to premixed combustion fuel).

The engine control unit 106 can change the premixed combustion fuel substitution rate without changing the operating speed of the engine. For example, the engine can continue operating at the same (or faster) speed to generate the same (or more) power when the premixed combustion fuel supply rate is reduced.

Optionally, the engine control unit can monitor the operating conditions of the engine and determine the autoignition delay associated with the operating conditions. The engine control unit can refer to the memory to calculate or determine the autoignition delay associated with the current or most recently obtained operating conditions. The engine control unit can direct an output device, such as a monitor, touchscreen, speaker, light, or the like, to visually and/or audibly present information representative of the autoignition delay that is calculated or determined. For example, the engine control unit can present the autoignition delay, the likelihood of engine knock associated with the autoignition delay, or the like, on a display to the operator of the powered system so that the operator can decide whether to change operation of the engine to avoid engine knock. The operator may decrease a throttle of the engine, derate the engine (e.g., decrease the maximum allowable power output of the engine regardless of throttle setting), move the powered system to a location with cooler ambient air, adjust the substitution rate, and the like. The operator can continue monitoring changes in the autoignition delay in real time to change how the system and/or engine operates to avoid or prevent engine knock.

Alternatively, the engine control unit can automatically change operation of the powered system and/or engine based on the autoignition delays that are being determined in real time by the engine control unit. As one example, if the autoignition delay falls below a designated threshold (e.g., the length of time between introduction of premixed combustion fuel into a cylinder of the engine and completion of the combustion cycle of the cylinder), then the engine control unit can automatically implement one or more responsive actions. These actions can include automatically derating the engine, automatically decreasing a throttle setting, speed, or power output of the engine, or the like. In one embodiment, the system includes a coolant source 216, such as a container of water or other coolant. A pump 218 connected with the coolant source can pull or push the coolant out of the source and into (via one or more conduits) one or more cylinders of the engine. For example, the engine control unit can control the pump to direct coolant into one or more cylinders, such as by spraying water into the cylinders. Directing the coolant into the cylinders can cool the temperature inside the cylinders which, in turn, can increase the autoignition delay (and decrease the likelihood of engine knock). The engine control unit can automatically spray coolant into one or more cylinders responsive to the autoignition delay falling below a threshold to reduce or eliminate the likelihood of engine knock.

Figure 3:
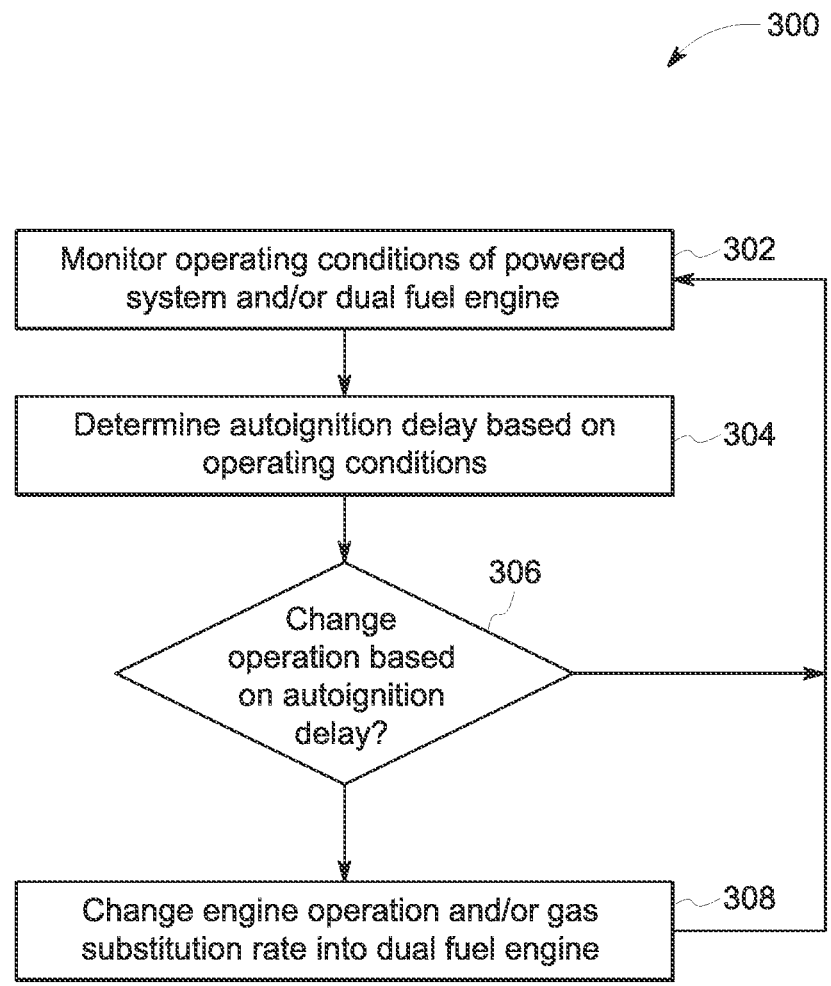
FIG. 3 illustrates a flowchart of one embodiment of a method for dynamically controlling premixed fuel substitution rates of a multi-fuel engine.

FIG. 3 illustrates a flowchart of one embodiment of a method 300 for dynamically controlling premixed combustion fuel substitution rates of a multi-fuel engine. The method can represent the operations performed by the processor(s) of the engine control unit in connection with the multi-fuel engine described herein. At step 302, operating conditions of a powered system and/or a multi-fuel engine of the powered system are monitored. For example, the manifold airflow temperature of the engine, the manifold airflow pressure of the engine, the air flow into or out of the engine, the rate at which non-premixed combustion fuel is supplied to the engine or one or more cylinders of the engine, the speed at which the engine is operating, the timing of fuel injection into the cylinder(s) of the engine, an autoignition delay that is calculated, an air-to-fuel ratio of the engine, the temperature of the engine exhaust, a turbocharger speed, an oxygen-to-fuel ratio of the engine, the fuel substitution ratio of the engine, and/or a cylinder pressure of the engine can be measured.

At step 304, an autoignition delay of the engine is determined. This delay can be based on the operating conditions that are monitored, as well as previous measurements or calculations of autoignition delays based on the same or other operating conditions, and optionally can be based on a transfer function, as described above. At step 306, a determination is made as to whether operation of the powered system and/or the multi-fuel engine is to be changed based on the autoignition delay that is calculated. For example, if the autoignition delay is too short, then operation of the powered system and/or engine may need to be modified to prevent engine knock. As a result, flow of the method can flow toward step 308. But, if the autoignition delay is sufficiently long to avoid engine knock, then flow of the method can return toward step 302. This allows for the repeated monitoring of operating conditions to determine whether these operating conditions indicate a likelihood of engine knock.

At step 308, operation of the engine and/or powered system is modified. As one example, the premixed combustion fuel substitution rate of the engine is modified. The amount of premixed combustion fuel delivered to the engine can be reduced, while the amount of non-premixed combustion fuel delivered to the engine is increased (to make up for the decrease in premixed combustion fuel). Reducing the amount of premixed combustion fuel to the engine can increase the autoignition delay and decrease the likelihood that engine knock occurs. As another example, the engine can be derated so that the engine operates at a lower power, lower temperature, or lower pressure and thereby reduces the likelihood of engine knock. In another example, coolant can be sprayed into cylinders of the engine to reduce the temperature in the cylinders, and thereby decrease the likelihood of engine knock from occurring. Flow of the method can return toward step 302 for the repeated monitoring of operating conditions to determine whether these operating conditions indicate a likelihood of engine knock.

In one embodiment, a method includes monitoring one or more operating conditions of a multi-fuel engine that consumes a mixture of air, a non-premixed combustion fuel, and a premixed combustion fuel, and determining a designated autoignition delay of the mixture of the air, the non-premixed combustion fuel, and the premixed combustion fuel. The designated autoignition delay represents a period of time following injection of the non-premixed combustion fuel and the premixed combustion fuel into a cylinder of the multi-fuel engine before the premixed combustion fuel ignites. The method also can include calculating an upper limit on an amount of the premixed combustion fuel that is supplied to the multi-fuel engine based on the one or more operating conditions that are monitored and the designated autoignition delay that is determined, and controlling flow of the non-premixed combustion fuel into the cylinder of the multi-fuel engine to prevent the amount of the non-premixed combustion fuel that is injected into the cylinder from exceeding the lower, non-zero limit. This embodiment may limit the maximum substitution rate of the premixed combustion fuel to be less than 100% of the combustion fuel supplied to the engine or cylinder.

Optionally, the designated autoignition delay represents a likelihood of engine knock of the multi-fuel engine. Optionally, the non-premixed fuel is diesel fuel, kerosene, JP8, or the like and the premixed combustion fuel is one or more of gasoline, ethanol, methanol, syngas, natural gas, liquified petroleum gas, or hydrogen gas. Optionally, the one or more operating conditions that are monitored include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine. Optionally, controlling the flow of the premixed combustion fuel into the cylinder includes reducing the flow of the premixed combustion fuel into the cylinder of the premixed combustion fuel into the cylinder.

Optionally, controlling the flow of the premixed combustion fuel into the cylinder to be less than the upper limit prevents engine knock in the cylinder of the engine. Optionally, the flow of the non-premixed combustion fuel into the cylinder of the engine is controlled to prevent the amount of the non-premixed combustion fuel that is injected into the cylinder from exceeding the lower, non-zero limit without an operating speed of the engine changing.

In one embodiment, a method includes monitoring one or more operating conditions of a multi-fuel engine that consumes a mixture of air, a non-premixed combustion fuel, and a premixed combustion fuel, measuring an amount of the premixed combustion fuel that is supplied to the multi-fuel engine, and calculating an autoignition delay of the mixture of the air, the non-premixed combustion fuel, and the premixed combustion fuel. The autoignition delay represents a period of time following injection of the non-premixed combustion fuel and the premixed combustion fuel into a cylinder of the multi-fuel engine before the premixed combustion fuel ignites during knocking of the engine. The method also includes modifying operation of the engine based on the autoignition delay that is calculated.

Optionally, modifying the operation of the engine includes reducing flow of the premixed combustion fuel into the cylinder of the engine. Optionally, modifying the operation of the engine includes decreasing flow of the non-premixed combustion fuel into the cylinder of the engine without eliminating flow of the non-premixed combustion fuel into the cylinder. Optionally, modifying the operation of the engine includes injecting a coolant into the cylinder of the engine.

Optionally, modifying the operation of the engine includes derating the engine. Optionally, modifying the operation of the engine includes changing injection timing of one or more of the premixed combustion fuel or the non-premixed combustion fuel into the cylinder. Optionally, the method also includes calculating an upper limit on the amount of the premixed combustion fuel that is supplied to the multi-fuel engine based on the one or more operating conditions that are monitored and the autoignition delay that is calculated, and controlling flow of the non-premixed combustion fuel into the cylinder of the engine to prevent the amount of the non-premixed combustion fuel that is injected into the cylinder from exceeding the lower, non-zero limit. Optionally, controlling the flow of the premixed combustion fuel into the cylinder includes reducing the flow of the premixed combustion fuel into the cylinder. Optionally, controlling the flow of the premixed combustion fuel into the cylinder to be less than the upper limit prevents engine knock in the cylinder of the engine. Optionally, the flow of the non-premixed combustion fuel into the cylinder of the engine is controlled to prevent the amount of the non-premixed combustion fuel that is injected into the cylinder from exceeding the lower, non-zero limit without an operating speed of the engine changing.

Optionally, the autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquified petroleum gas, or hydrogen gas. Optionally, the one or more operating conditions that are monitored include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine.

In one embodiment, an engine control unit of a multi-fuel engine includes hardware circuitry that includes one or more processors configured or programmed to monitor one or more operating conditions of the multi-fuel engine that consumes a mixture of air, a non-premixed combustion fuel, and a premixed combustion fuel. The one or more processors determine a designated autoignition delay of the mixture of the air, the non-premixed combustion fuel, and the premixed combustion fuel. The designated autoignition delay represents a period of time following introduction of the non-premixed combustion fuel and the premixed combustion fuel into a cylinder of the multi-fuel engine before the premixed combustion fuel ignites. The one or more processors also calculate an upper limit on an amount of the premixed combustion fuel that is supplied to the multi-fuel engine based on the one or more operating conditions that are monitored and the designated autoignition delay that is determined. The one or more processors also control flow of the non-premixed combustion fuel into the cylinder of the engine to prevent the amount of the non-premixed combustion fuel that is injected into the cylinder from exceeding the lower, non-zero limit.

Optionally, the designated autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquified petroleum gas, or hydrogen gas. Optionally, the one or more operating conditions that are monitored by the one or more processors include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine.

Optionally, the one or more processors control the flow of the premixed combustion fuel into the cylinder by reducing the flow of the premixed combustion fuel into the cylinder. Optionally, the one or more processors control the flow of the premixed combustion fuel into the cylinder to be less than the upper limit to prevent engine knock in the cylinder of the engine. Optionally, the one or more processors control the flow of the non-premixed combustion fuel into the cylinder of the engine to prevent the amount of the non-premixed combustion fuel that is injected into the cylinder from exceeding the lower, non-zero limit without an operating speed of the engine changing.

In one embodiment, an engine control unit of a multi-fuel engine includes hardware circuitry that includes one or more processors configured or programmed to monitor one or more operating conditions of the multi-fuel engine that consumes a mixture of air, a non-premixed combustion fuel, and a premixed combustion fuel. The one or more processors determine an amount of the premixed combustion fuel that is supplied to the multi-fuel engine and to calculate an autoignition delay of the mixture of the air, the non-premixed combustion fuel, and the premixed combustion fuel. The autoignition delay represents a period of time following introduction of the non-premixed combustion fuel and the premixed combustion fuel into a cylinder of the multi-fuel engine before the premixed combustion fuel ignites during knocking of the multi-fuel engine. The one or more processors also modify operation of the engine based on the autoignition delay that is calculated.

Optionally, the one or more processors modify the operation of the engine by reducing flow of the premixed combustion fuel into the cylinder. Optionally, the one or more processors modify the operation of the engine by increasing flow of the non-premixed combustion fuel into the cylinder of the. Optionally, the one or more processors modify the operation of the engine by injecting a coolant into the cylinder of the engine.

Optionally, the one or more processors modify the operation of the engine by derating the engine. Optionally, the one or more processors modify the operation of the engine by changing injection timing of one or more of the premixed combustion fuel or the non-premixed combustion fuel into the cylinder. Optionally, the one or more processors also calculate an upper limit on the amount of the premixed combustion fuel that is supplied to the multi-fuel engine based on the one or more operating conditions that are monitored and the autoignition delay that is calculated. The one or more processors also can be configured or programmed to control flow of the non-premixed combustion fuel into the cylinder of the engine to prevent the amount of the non-premixed combustion fuel that is injected into the cylinder from exceeding the lower, non-zero limit.

Optionally, the one or more processors control the flow of the premixed combustion fuel into the cylinder by reducing the flow of the premixed combustion fuel into the cylinder. Optionally, the one or more processors control the flow of the premixed combustion fuel into the cylinder to be less than the upper limit prevents engine knock in the cylinder of the engine. Optionally, the one or more processors control the flow of the non-premixed combustion fuel into the cylinder of the engine to prevent the amount of the non-premixed combustion fuel that is injected into the cylinder from exceeding the lower, non-zero limit without an operating speed of the engine changing. Optionally, the autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquified petroleum gas, or hydrogen gas.

Optionally, the one or more processors monitor one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine as the one or more operating conditions.

In one embodiment, an engine control unit of a multi-fuel engine is provided. The engine consumes a mixture of a first combustion fuel and a second combustion fuel. The engine control unit includes hardware circuitry that includes one or more processors configured or programmed to calculate an autoignition delay of the mixture of the air and the second combustion fuel based on current operating conditions of the multi-fuel engine. The one or more processors also are configured or programmed to calculate an upper limit on an amount of the second combustion fuel that is supplied to the multi-fuel engine based on the autoignition delay that is calculated.

Optionally, the one or more processors also are configured or programmed to control flow of the second combustion fuel into the engine to control the amount of the second combustion fuel that is injected into the engine from exceeding the upper limit.

Optionally, the one or more processors are configured or programmed to change at least one of the operating conditions based on the designated autoignition delay.

Optionally, the first combustion fuel comprises diesel fuel, kerosene, JP8 jet fuel and the second combustion fuel comprises one or more of gasoline, ethanol, methanol, syngas, natural gas, liquified petroleum gas, or hydrogen gas.

Optionally, the one or more operating conditions include one or more of a manifold airflow temperature of the engine, a manifold airflow pressure of the engine, a flow rate of the air into the engine, a flow rate of the non-premixed combustion fuel into the engine, an operating speed of the engine, or an injection timing of the engine.

Optionally, the one or more processors are configured or programmed to control the flow of the second combustion fuel into the engine by increasing the flow of the first combustion fuel into the engine without eliminating the flow of the second combustion fuel into the engine.

Optionally, the one or more processors are configured or programmed to calculate the upper limit to include a buffer having a value that is updated based on detection of a knock signal from a knock sensor.

In one embodiment, a method includes calculating an autoignition delay of a mixture of a first combustion fuel and a second combustion fuel that are supplied to a multi-fuel engine. The autoignition delay is calculated based on current operating conditions of the multi-fuel engine. The method also includes calculating an upper limit on an amount of the second combustion fuel that is supplied to the multi-fuel engine based on the autoignition delay that is calculated.

Optionally, the method also includes controlling flow of the second combustion fuel into the engine to control the amount of the second combustion fuel that is injected into the engine from exceeding the upper limit.

Optionally, the method also includes changing at least one of the operating conditions based on the autoignition delay.

Optionally, the first combustion fuel comprises diesel fuel, kerosene, JP8 jet fuel and the second combustion fuel comprises one or more of gasoline, ethanol, methanol, syngas, natural gas, liquified petroleum gas, or hydrogen gas.

Optionally, the one or more operating conditions include one or more of a manifold airflow temperature of the engine, a manifold airflow pressure of the engine, a flow rate of the air into the engine, a flow rate of the non-premixed combustion fuel into the engine, an operating speed of the engine, or an injection timing of the engine.

Optionally, the method also includes controlling flow of the second combustion fuel into the engine by increasing the flow of the first combustion fuel into the engine without eliminating the flow of the second combustion fuel into the engine.

Optionally, the upper limit is calculated to include a buffer having a value that is updated based on detection of a knock signal from a knock sensor.

In one embodiment, a method includes monitoring one or more operating conditions of a multi-fuel engine that consumes a mixture of air, a non-premixed combustion fuel, and a premixed combustion fuel; determining an amount of the premixed combustion fuel that is supplied to the multi-fuel engine; calculating an autoignition delay of the mixture of the air and the premixed combustion fuel, the autoignition delay representing a period of time before the premixed combustion fuel ignites during knocking of the engine; and modifying operation of the engine based on the autoignition delay that is calculated.

Optionally, modifying the operation of the engine includes reducing flow of the non-premixed combustion fuel into at least one cylinder of the engine without eliminating the flow of the non-premixed combustion fuel into the cylinder.

Optionally, modifying the operation of the engine includes injecting a coolant into at least one cylinder of the engine.

Optionally, modifying the operation of the engine includes derating the engine.

Optionally, modifying the operation of the engine includes changing an injection timing of one or more of the premixed combustion fuel or of the non-premixed combustion fuel in at least one cylinder of the engine.

Optionally, modifying the operation of the engine includes changing a flow rate of the non-premixed combustion fuel into at least one cylinder of the engine.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An engine control unit of a multi-fuel engine that consumes a first combustion fuel and a pre-mixed combustion fuel mixture, the engine control unit comprising:
   hardware circuitry that includes one or more processors configured to calculate an autoignition delay of the first combustion fuel and the pre-mixed combustion fuel mixture based on one or more operating conditions of the multi-fuel engine,
   the one or more processors also configured to calculate an upper limit on an amount of the pre-mixed combustion fuel mixture that is permitted to be supplied to the multi-fuel engine based on the autoignition delay that is calculated; and
   decrease the amount of the pre-mixed combustion fuel mixture and increase an amount of the first combustion fuel based on the autoignition delay being less than a designated threshold.

2. The engine control unit of claim 1, wherein one or more of the first combustion fuel or the pre-mixed combustion fuel mixture is hydrogen.

3. The engine control unit of claim 1, wherein the one or more processors also are configured to control flow of the pre-mixed combustion fuel mixture into the multi-fuel engine to control the amount of the pre-mixed combustion fuel mixture that is injected into the multi-fuel engine from exceeding the upper limit.

4. The engine control unit of claim 1, wherein the one or more processors are configured to direct a coolant be injected into one or more cylinders of the multi-fuel engine responsive to the autoignition delay that is calculated falling below a designated threshold.

5. The engine control unit of claim 1, wherein the one or more processors are configured to change at least one of the operating conditions based on a designated autoignition delay.

6. The engine control unit of claim 1, wherein the one or more operating conditions include one or more of a manifold airflow temperature of the multi-fuel engine, a manifold airflow pressure of the multi-fuel engine, a flow rate of the air into the multi-fuel engine, a flow rate of the pre-mixed combustion fuel mixture into the multi-fuel engine, or an operating speed of the multi-fuel engine.

7. The engine control unit of claim 1, wherein the one or more processors are configured to control the flow of the pre-mixed combustion fuel mixture into the multi-fuel engine by increasing the flow of the first combustion fuel into the multi-fuel engine without eliminating the flow of the pre-mixed combustion fuel mixture into the multi-fuel engine.

8. The engine control unit of claim 1, wherein the one or more processors are configured to calculate the upper limit to include a buffer having a value that is updated based on detection of a knock signal from a knock sensor.

9. A method comprising:
calculating an autoignition delay of a mixture of a first combustion fuel and a pre-mixed combustion fuel mixture that are supplied to a multi-fuel engine, the autoignition delay calculated based on one or more operating conditions of the multi-fuel engine;
calculating an upper limit on an amount of the pre-mixed combustion fuel mixture that is supplied to the multi-fuel engine based on the autoignition delay that is calculated;
controlling flow of the pre-mixed combustion fuel mixture into the multi-fuel engine to control the amount of the pre-mixed combustion fuel mixture that is injected into and consumed by the multi-fuel engine from exceeding the upper limit; and
decreasing the amount of the pre-mixed combustion fuel and increasing an amount of the first combustion fuel if the autoignition delay is less than a designated threshold.

10. The method of claim 9, further comprising:
injecting coolant into one or more cylinders of the multi-fuel engine responsive to the autoignition delay that is calculated falling below the designated threshold.

11. The method of claim 9, further comprising:
changing at least one of the operating conditions based on the autoignition delay.

12. The method of claim 9, wherein the one or more operating conditions include one or more of a manifold airflow temperature of the multi-fuel engine, a manifold airflow pressure of the multi-fuel engine, a flow rate of air into the multi-fuel engine, a flow rate of the pre-mixed combustion fuel mixture into the multi-fuel engine, or an operating speed of the engine.

13. The method of claim 9, further comprising:
controlling flow of the pre-mixed combustion fuel mixture into the multi-fuel engine by increasing flow of the first combustion fuel into the multi-fuel engine without eliminating flow of the pre-mixed combustion fuel mixture into the multi-fuel engine.

14. The method of claim 9, wherein the upper limit is calculated to include a buffer having a value that is updated based on detection of a knock signal from a knock sensor.

15. The method of claim 9, wherein the first combustion fuel comprises one or more of kerosene or JP8 jet fuel, and the pre-mixed combustion fuel mixture comprises one or more of ethanol, syngas, or liquified petroleum gas.

16. An engine control unit comprising:
one or more processors configured to determine one or more of a manifold airflow temperature of an engine that concurrently consumes both a first combustion fuel and a pre-mixed combustion fuel mixture, a manifold airflow pressure of the engine, an airflow into or out of the engine, a speed of the engine, an air-to-fuel ratio of the engine, an exhaust temperature of the engine, a turbocharger speed, or a cylinder pressure of one or more cylinders of the engine,
the one or more processors configured to determine an autoignition delay of the first combustion fuel and the pre-mixed combustion fuel based on the one or more of the manifold airflow temperature, the manifold airflow pressure, the airflow, the speed of the engine, the air-to-fuel ratio, the exhaust temperature, the turbocharger speed, or the cylinder pressure,
the one or more processors configured to control an amount of the pre-mixed combustion fuel mixture that is supplied to the engine while both the first combustion fuel and the pre-mixed combustion fuel mixture continue to be supplied to the engine based on the autoignition delay; and
the one or more processors configured to decrease the amount of the pre-mixed combustion fuel mixture and increase an amount of the first combustion fuel to increase the autoignition delay.

17. The engine control unit of claim 16, wherein the one or more processors are configured to one or more of derate the engine, decrease a throttle setting of the engine, inject coolant into the one or more cylinders of the engine, or change a flow rate of the coolant through an exhaust gas recirculation system responsive to the autoignition delay that is determined falling below a designated threshold.

18. The engine control unit of claim 16, wherein the one or more processors are configured to determine the autoignition delay based on one or more of the manifold airflow temperature.

19. The engine control unit of claim 16, wherein the one or more processors are configured to determine the autoignition delay based on the manifold airflow pressure.

20. The engine control unit of claim 16, the one or more processors are configured to decrease the amount of pre-mixed combustion fuel responsive to the autoignition delay falling below the designated threshold.

* * * * *